US011925262B2

(12) United States Patent
Cooper et al.

(10) Patent No.: US 11,925,262 B2
(45) Date of Patent: Mar. 12, 2024

(54) RECEPTACLE ASSEMBLIES AND LOCKING SYSTEMS FOR SUCH ASSEMBLIES

(71) Applicant: ARB Corporation Limited, Kilsyth (AU)

(72) Inventors: Paul William Cooper, Kilsyth (AU); John Desmond Clark, Kilsyth (AU); Andrew Harry Brown, Kilsyth (AU)

(73) Assignee: ARB CORPORATION LIMITED, Kilsyth (AU)

( * ) Notice: Subject to any disclaimer, the term of this patent is extended or adjusted under 35 U.S.C. 154(b) by 107 days.

(21) Appl. No.: 17/179,706

(22) Filed: Feb. 19, 2021

(65) Prior Publication Data

US 2021/0259417 A1 Aug. 26, 2021

(30) Foreign Application Priority Data

Feb. 21, 2020 (AU) ................................ 2020900502

(51) Int. Cl.

*A47B 88/477* (2017.01)
*A47B 88/437* (2017.01)
*E05B 1/00* (2006.01)

(52) U.S. Cl.

CPC .......... *A47B 88/477* (2017.01); *A47B 88/437* (2017.01); *E05B 1/00* (2013.01); *A47B 2210/0037* (2013.01)

(58) Field of Classification Search

CPC ................ A47B 88/477; A47B 88/437; A47B 2210/0037; A47B 88/493; A47B 2210/0008; A47B 2210/0043; A47B 2210/0059; A47B 88/40

See application file for complete search history.

(56) References Cited

U.S. PATENT DOCUMENTS 2,859,070 A * 11/1958 Gomersall ........... A47B 88/493 384/19
3,574,437 A * 4/1971 Stein .................... A47B 88/487 384/19
3,697,140 A * 10/1972 Livingston ........... A47B 88/467 384/19

(Continued)

FOREIGN PATENT DOCUMENTS

WO WO-2018165717 A1 * 9/2018 ............. A47B 88/40

*Primary Examiner* — Hanh V Tran

(74) *Attorney, Agent, or Firm* — Schwabe, Williamson & Wyatt, P.C.

(57) ABSTRACT

Runner assembly 10 for carrying a receptacle 12 towards and away from a structure 14. The runner assembly 10 includes: at least one pair of first bearings 16, each first bearing 16 being mountable to the structure 14 so that the first bearings 16 of the, or each, pair are spaced apart; an elongate runner 18 defining a longitudinal length and having an opposed pair of first tracks 22 spaced from each other, each first track 22 configured to cooperate with the first bearings 16 to allow the runner 18 to be carried by the first bearings 16; at least one second bearing 24 mounted to the runner 18; and an elongate track member 26 mountable to the receptacle 12, the track member 26 having a second track 28 defining at least one pair of opposed bearing surfaces 30, 31 spaced from each other and configured to cooperate with the at least one second bearing 24 to allow the track member 26 to be carried by the at least one second bearing 24.

11 Claims, 10 Drawing Sheets

(56) References Cited

U.S. PATENT DOCUMENTS

| | | | | | |
|---|---|---|---|---|---|
| 5,302,030 | A * | 4/1994 | Buie | A47B 88/437 | |
| | | | | 384/57 | |
| 5,344,228 | A * | 9/1994 | Kovarik | A47B 88/467 | |
| | | | | 312/334.17 | |
| 5,520,452 | A * | 5/1996 | Petersen | A47B 88/57 | |
| | | | | 312/334.13 | |
| 5,733,026 | A * | 3/1998 | Munachen | A47B 88/437 | |
| | | | | 312/334.44 | |
| 10,085,559 | B2 * | 10/2018 | Schön | A47B 88/941 | |
| 2013/0313954 | A1 * | 11/2013 | Koelling | A47B 88/57 | |
| | | | | 312/319.1 | |
| 2017/0340112 | A1 * | 11/2017 | Miles | A47B 88/57 | |
| 2020/0077796 | A1 * | 3/2020 | Miles | H05K 7/1411 | |

* cited by examiner

RECEPTACLE ASSEMBLIES AND LOCKING SYSTEMS FOR SUCH ASSEMBLIES

CROSS-REFERENCE TO RELATED APPLICATION(S)

This application claims priority to Australian Patent Application No. 2020900502, filed on Feb. 21, 2020, which is hereby incorporated by reference in its entirety.

TECHNICAL FIELD

The present disclosure relates generally to receptacle assemblies. In particular, the disclosure relates to runner assemblies for carrying a receptacle, such as a drawer, relative to a structure, such as a cabinet. The disclosure also relates to locking systems for receptacles which are slidably movable relative to a structure, such as a drawer slidable mounted to a cabinet.

BACKGROUND

Drawers generally define an opened-top recess which is used to store items. They are typically slidably mounted to a housing, such as a cabinet or rack, to move in a linear direction relative to the housing to allow access to the recess. This usually involves the drawer being carried by a runner mechanism including at least one elongate runner being carried along a track defined by a rail or the like. The runner mechanism carries the drawer between a closed, or stowed, position, where the drawer is arranged within the cabinet, and an open, or full-extension, position, where the drawer is arranged to extend a maximum distance from the cabinet. Access to the contents of such drawers in the full-extension position is often limited as the runner mechanism is typically configured to retain a portion of the drawer within the cabinet to provide adequate support for the drawer and a maximum cargo load.

When installed in vehicles, drawers and runner mechanisms can be exposed to vibrations, significant forces, and dusty, sandy and/or humid environments. This is particularly applicable to drawers installed in vehicles adapted for off-road use. The loads, vibration and particle exposure can cause damage to the drawer and/or runner mechanism resulting in decreased maintenance periods or mechanical failure.

Typical forces and vibrations exerted on a drawers installed in a vehicle can cause the drawer to inadvertently extend from the cabinet to expose the contents of the drawer. To address this issue, some drawers have a locking mechanism arranged in a front face to allow a user to lock the drawer to the cabinet in the closed position. However such locking mechanisms often add substantial bulk and weight to the drawer which can detract from ease-of-use, particularly for users with restricted movement.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to some disclosed embodiments, there is provided a runner assembly for carrying a receptacle towards and away from a structure. The runner assembly includes: at least one pair of first bearings, each first bearing being mountable to the structure so that the first bearings of the, or each, pair of first bearings are spaced apart; an elongate runner defining a longitudinal length and having an opposed pair of first tracks spaced from each other, each first track configured to cooperate with the first bearings to allow the runner to be carried by the first bearings; at least one second bearing mounted to the runner; and an elongate track member mountable to the receptacle, the elongate track member having a second track defining at least one pair of opposed bearing surfaces spaced from each other and configured to cooperate with the at least one second bearing to allow the track member to be carried by the at least one second bearing. The second track is configured, in use, to receive the at least one second bearing such that one bearing surface of the, or each, pair of bearing surfaces is arranged proximal to one of the first tracks of the runner, and the other bearing surface of the, or each, pair of bearing surfaces is arranged proximal to the other first track of the runner.

Each of the first tracks and the second track may be shaped to cooperate with the respective bearings to facilitate longitudinal displacement of the runner relative to the structure and the track member whilst constraining transverse displacement of the runner relative to the structure and the track member.

The second track may include two pairs of the bearing surfaces, where each bearing surface of each pair of bearing surfaces is arranged to incline relative to a corresponding bearing surface of the other pair of bearing surfaces to define a valley, and each valley is configured to cooperate with the at least one second bearing. The valleys may be arranged to face towards each other to allow trapping the at least one second bearing between the valleys.

The runner assembly may include a plurality of the second bearings spaced longitudinally along the runner. In such embodiments, the plurality of second bearings may be arranged in two rows extending longitudinally along the runner and spaced apart from each other towards the first tracks, wherein the second bearings of one row are arranged, in use, to abut one of the bearing surfaces of the, or each pair of bearing surfaces, and the second bearings of the other row are arranged to abut the other bearing surface or the, or each pair of bearing surfaces. Furthermore, the second bearings of one row may be spaced longitudinally along the runner and alternately interposed with the second bearings of the other row.

Each first bearing and each second bearing may be configured as a rotatably mountable roller.

Each second bearing may be rotatably mounted to a shaft extending from the runner, the shaft defining an internal thread and having a fastener engaged with the thread to retain the second bearing to the shaft, the fastener shaped to allow flush mounting to the second bearing.

Each roller may define a convex running surface configured to cooperate with one of the first tracks and the second track. Similarly, each first track may define a concave bearing surface shaped to at least partially receive the running surface of the first bearings.

The runner may define a channel and the plurality of second bearings are mounted within the channel.

According to other embodiments there is provided a receptacle assembly including: a housing; at least one pair of first bearings mounted to the housing so that the first bearings of the, or each, pair of first bearings are spaced apart; an elongate runner defining a longitudinal length and having an opposed pair of first tracks spaced from each other, each first track configured to cooperate with the first bearings to allow the runner to be carried by the first bearings; at least one second bearing mounted to the runner; and a receptacle having a second track, or an elongate track member defining the second track and mounted to the receptacle, the second track defining at least one pair of opposed bearing surfaces spaced from each other and configured to be carried by the at least one second bearing. The second track is configured, in use, to receive the at least one second bearing such that one bearing surface is arranged against an operatively top region of the at least one second bearing and the other bearing surface of the, or each, pair of bearing surfaces is arranged against an operatively bottom region of the at least one second bearing. The runner is arranged between the housing and the receptacle such that the first tracks are carried by the first bearings and the second track receives the at least one second bearing so that the track member is carried by the at least one second bearing.

The housing may be configured as a cabinet and the receptacle configured as a drawer.

According to further embodiments there is provided a locking system for a receptacle slidably mounted to a structure. The locking system includes: a powered locking mechanism securable relative to one of the receptacle and the structure, the locking mechanism operable to releasably secure the receptacle in a locked position to constrain movement relative to the structure; an actuator securable to the receptacle, the actuator operable to cause the locking mechanism to release the receptacle to allow movement relative to the structure; a first electrical contact connected to the actuator, the first contact being mountable to the receptacle; and a second electrical contact connected to the locking mechanism, the second contact being mountable to the structure to allow coupling with the first electrical contact when the receptacle is in the locked position.

Where the receptacle has a handle to allow a user to move the receptacle relative to the structure, and the actuator may include a depressible button configured to be mounted to the handle.

Where the receptacle defines a rear portion, and the locking mechanism may be securable to the structure to allow releasably engaging the rear portion.

The locking system may also include a biasing mechanism mountable to one of the receptacle and the structure to allow biasing the receptacle away from the locked position.

The biasing mechanism may include a resiliently deformable member securable to one of the receptacle and the structure such that the resiliently deformable member is compressed when the receptacle is in the locked position.

According to other embodiments there is provided a receptacle assembly including: a housing; a receptacle slidably mounted to the housing; a powered locking mechanism securable relative to one of the receptacle and the housing, the locking mechanism operable to releasably secure the receptacle in a locked position to constrain movement relative to the housing; an actuator secured to the receptacle, the actuator operable to cause the locking mechanism to release the receptacle to allow movement relative to the housing; a first electrical contact connected to the actuator, the first contact mounted to the receptacle; and a second electrical contact connected to the locking mechanism, the second contact mounted to the housing to allow coupling with the first electrical contact when the receptacle is in the locked position.

The housing may be configured as a cabinet and the receptacle may be configured as a drawer.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF FIGURES

Embodiments will now be described by way of example only with reference to the accompany figures in which.

DESCRIPTION OF EMBODIMENTS

Figure 1:
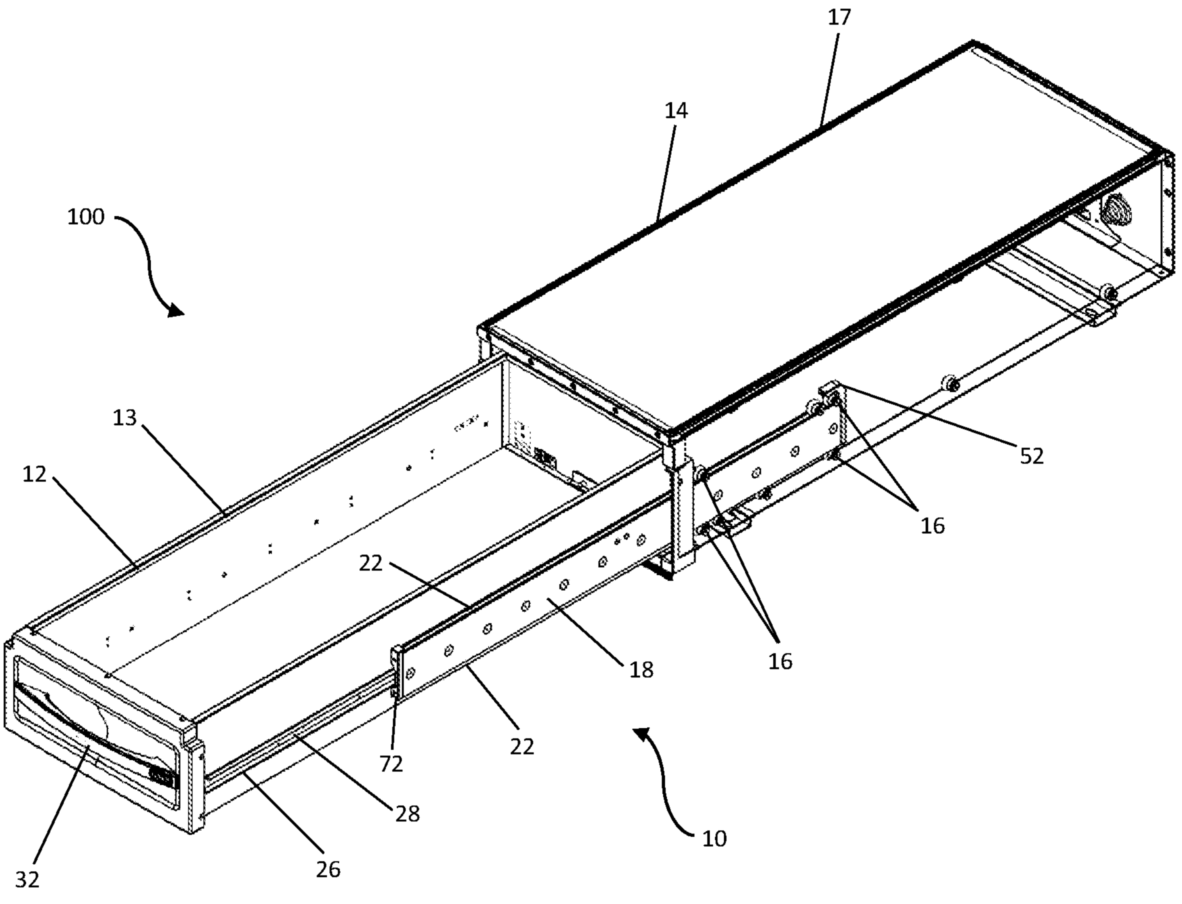
FIG. 1 is a front perspective view of a receptacle assembly in a first configuration where a receptacle is slidably mounted to a cabinet by a runner assembly so that the receptacle extends away from the cabinet, and a side wall of the cabinet is illustrated as transparent.

In the figures, reference numeral 10 generally designates a runner assembly 10 for carrying a receptacle 12 towards and away from a structure 14. The runner assembly 10 includes: at least one pair of first bearings 16, each first bearing 16 being mountable to the structure 14 so that the first bearings 16 of the, or each, pair are spaced apart; an elongate runner 18 defining a longitudinal length and having an opposed pair of first tracks 22 spaced from each other, each first track 22 configured to cooperate with the first bearings 16 to allow the runner 18 to be carried by the first bearings 16; at least one second bearing 24 mounted to the runner 18; and an elongate track member 26 mountable to the receptacle 12, the track member 26 having a second track 28 defining at least one pair of opposed bearing surfaces 30, 31 spaced from each other and configured to cooperate with the at least one second bearing 24 to allow the track member 26 to be carried by the at least one second bearing 24. The second track 28 is configured, in use, to receive the at least one second bearing 24 such that one bearing surface 30 of the, or each, pair of bearing surfaces 30, 31 is arranged proximal to one of the first tracks 22 of the runner 18, and the other bearing surface 31 of the, or each, pair of bearing surfaces 30, 31 is arranged proximal to the other first track 22 of the runner 18.

In the illustrated embodiment, the receptacle 12 is in the form of a drawer 13 and the structure 14 is in the form of a cabinet 17. It will be appreciated that in other embodiments (not illustrated), the runner assembly 10 is configured to carry other receptacles, such as a tray, tub or container, relative to other structures, such as a housing, rack or walls of a building.

FIG. 1 shows a receptacle assembly 100 including the drawer 13 slidably mounted to the cabinet 17 by the runner assembly 10. A side wall 15 of the cabinet 17 is shown transparent to assist viewing the runner assembly 10. The receptacle assembly 100 is shown in a first configuration where the drawer 13 is supported by the runner assembly 10 in a full-extension position to extend a maximum distance away from the cabinet 17. In the illustrated embodiment, the runner assembly 100 is configured to arrange the drawer 13 outside of the cabinet 17 in the full-extension position to optimise access to a cargo recess defined by the drawer 13.

Figure 3:
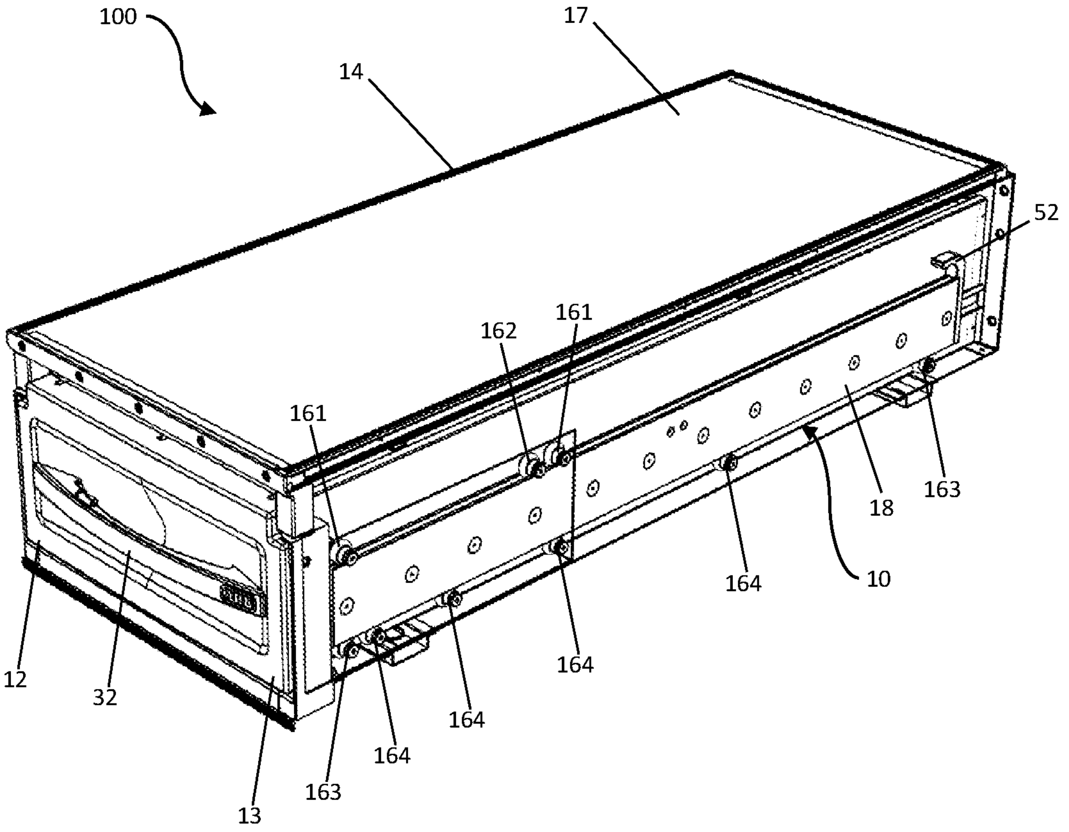
FIG. 3 is a front perspective view of the receptacle assembly shown in FIG. 1 in a second configuration where the receptacle is arranged within the cabinet, and the side wall is illustrated as transparent.

FIG. 3 shows the receptacle assembly 100 in a second configuration where the drawer 13 is supported by the runner assembly 10 in a stowed position to be arranged within a recess defined by the cabinet 17. The runner assembly 10 is arranged to facilitate linear movement of the drawer 13 between the full-extension position and the stowed position.

Figure 2:
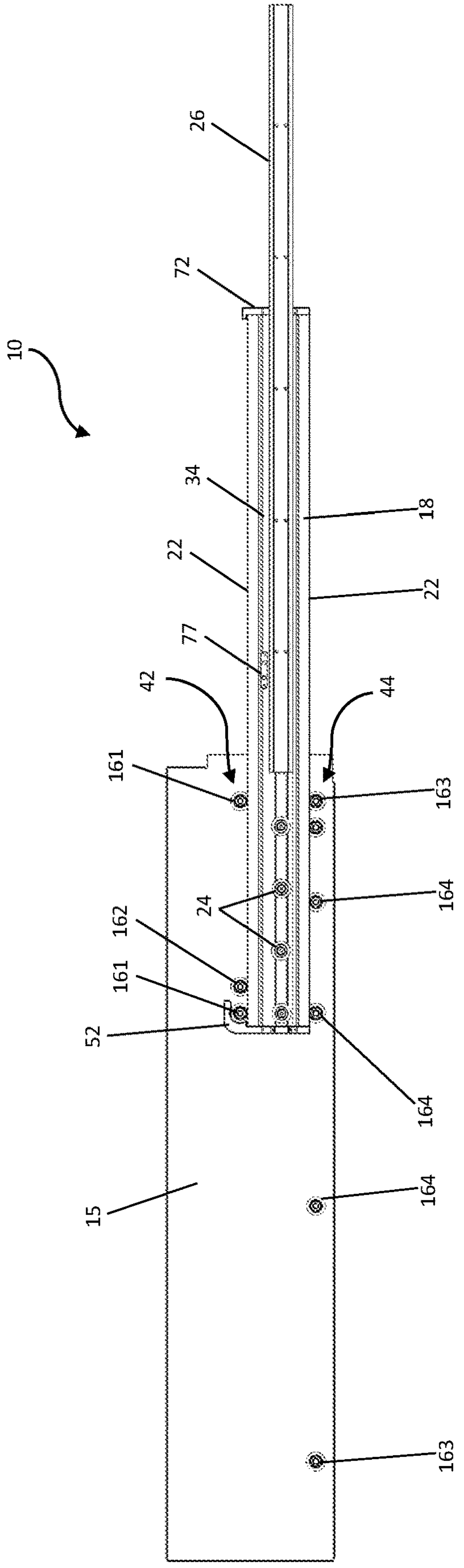
FIG. 2 is a side view of the runner assembly of FIG. 1 shown mounted to a side wall of the cabinet in isolation.
Figure 4:
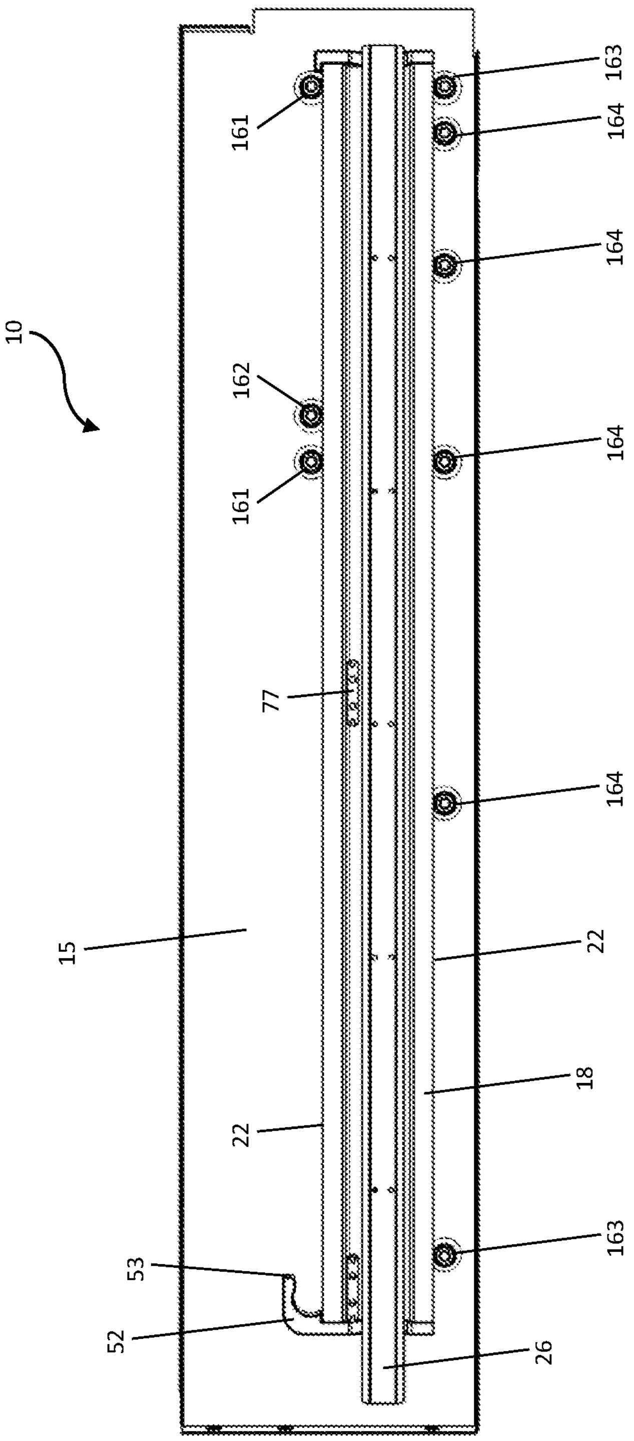
FIG. 4 is a side view of the runner assembly of FIG. 3 shown mounted to a side wall of the cabinet in isolation.

FIGS. 2 and 4 show the runner assembly 10 secured to the side wall 15 of the cabinet 17 in isolation and arranged in the first and second configurations, respectively. In the illustrated embodiment, the runner assembly 10 includes a plurality of pairs of the first bearings 16, each mounted to the side wall 15. The first bearings 16 in each pair are arranged to be spaced apart to allow the runner 18 to be received between the bearings 16 of the pair. In other embodiments (not shown), the runner assembly 10 includes only a single pair of first bearings 16 mountable to the side wall 15 to receive the runner 18 between the bearings 16.

The first bearings 16 are mountable to the side wall 15 to form two linear, parallel rows 42, 44 spaced apart from each other, each row 42, 44 including a plurality of the first bearings 16 spaced along the respective row 42, 44. The upper row 42 includes one of the first bearings 161 arranged at each end, and a further first bearing 162 arranged towards a distal end of the row 42 to provide additional support for when the drawer 13 is arranged in the full-extension position and exerts a cantilevered force pivoting about the lower row 44. The lower row 44 includes one of the first bearings 163 arranged at each end and intermediate first bearings 164 arranged between the ends. An increased density of intermediate first bearings 164 are arranged towards a proximal end of the row 44 to provide additional support when the drawer 13 is arranged in the full-extension position. It will be appreciated that in other embodiments (not shown), each row 42, 44 may include more or less first bearings 16.

In the illustrated embodiment, each first bearing 16 is in the form of a rotatably mountable roller. Each first bearing 16 is mounted to the side wall 15 to be rotatable relative to the side wall 15. In other embodiments (not illustrated), one or more of the first bearings 16 are in the form of a rail. In other embodiments (not illustrated), one or more of the first bearings are in the form of a non-rotatable bushing. In such embodiments, the rail and/or bushing may be formed from a self-lubricating material, such as nylon.

Figure 5:
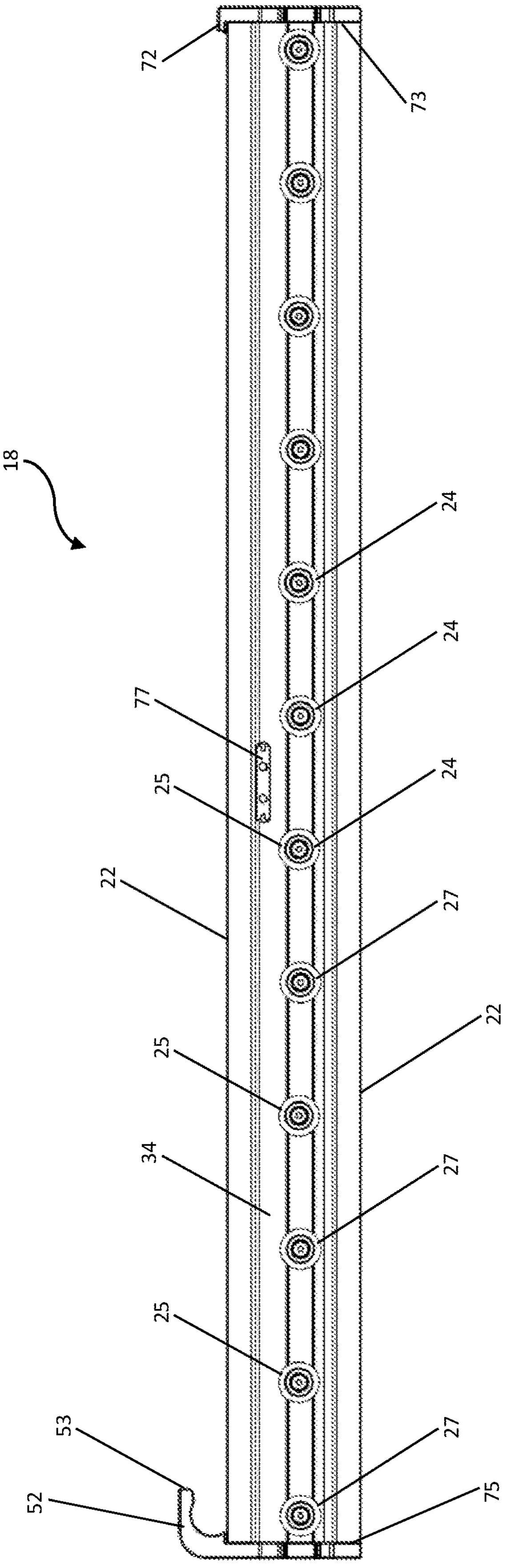
FIG. 5 is a side view of a runner, which is part of the runner assembly illustrated in the previous figures, shown in isolation.

FIG. 5 shows a side view of the runner 18 in isolation. The runner 18 defines a longitudinal length between opposed ends 73, 75. A catch member 52 is mounted to a distal end 75 of the runner 18 and a stop cap 72 is mounted to a proximal end 73 of the runner 18. The catch member 52 is arranged to interact with the first bearings 16 to limit longitudinal displacement of the runner 18 relative to the cabinet 17. A stopping element, in the form of a stop block 77, is mounted to the runner 18 and arranged to interact with the drawer 13, or a structure mounted to the drawer 13 such as a complementary block, to limit displacement of the runner 18 relative to the drawer 13.

In the illustrated configuration, the catch member 52 includes a resiliently deformable detent 53 shaped to allow engaging the first bearing 161 arranged at the distal end of the upper row 42. Engaging the catch member 52 with the first bearing 161 allows locking the drawer 13 in the full-extension position and inhibiting lateral movement of the drawer 13 relative to the cabinet 17.

Figure 6:
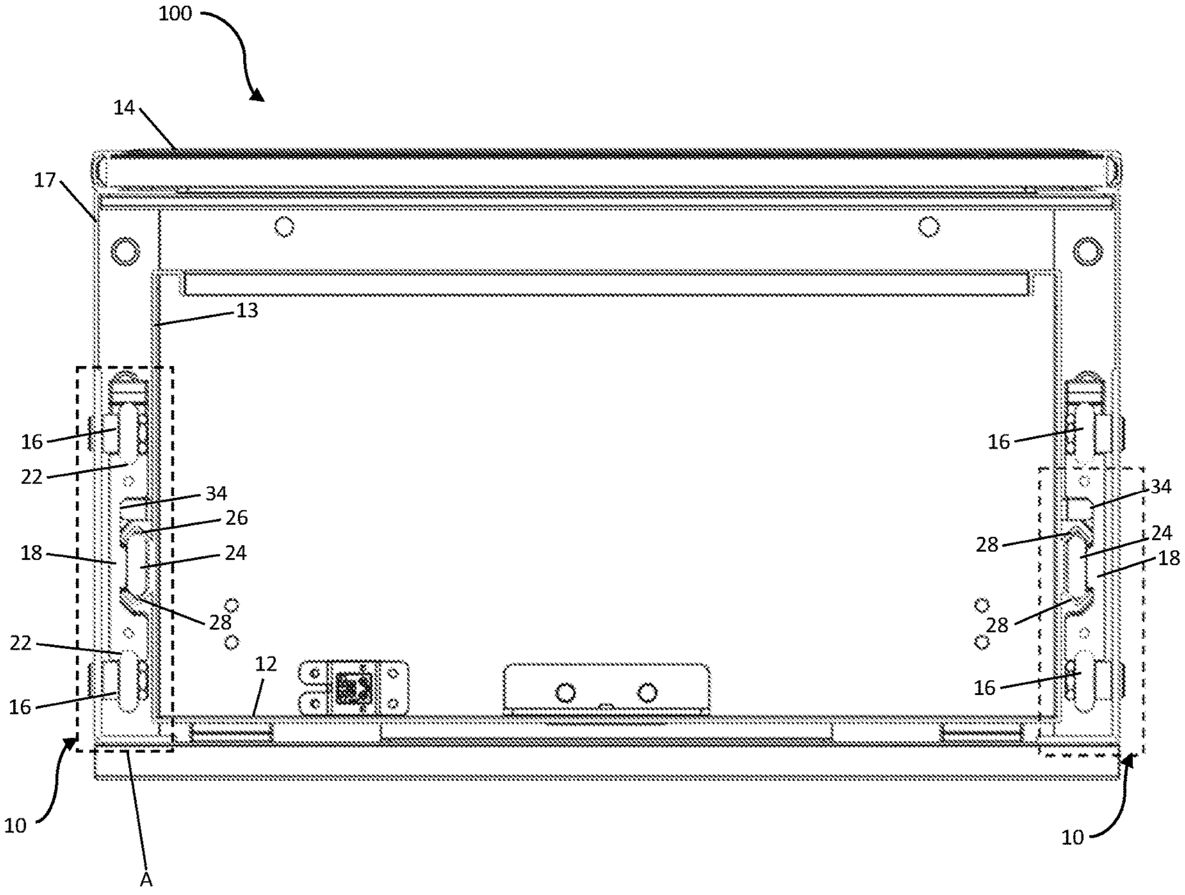
FIG. 6 is a cross-sectional front view of the receptacle assembly shown in FIGS. 1 and 3.
Figure 7:
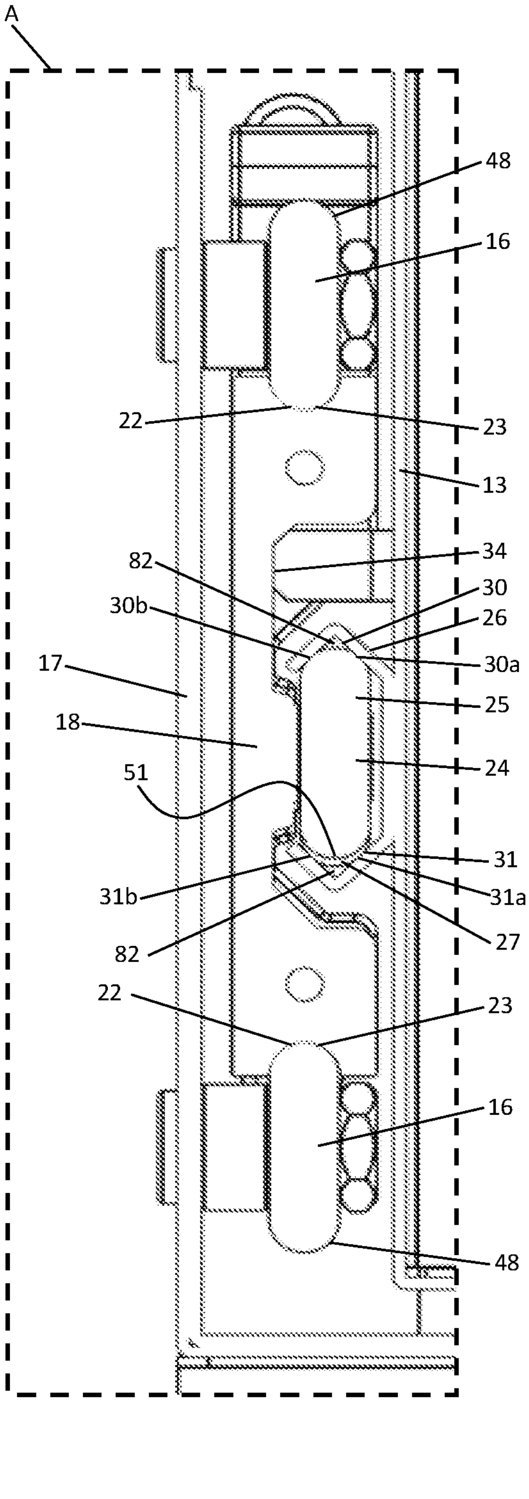
FIG. 7 is detailed view of the receptacle assembly as shown in Box A delineated in FIG. 6.

Best shown in FIGS. 6 and 7, the runner 18 defines the pair of first tracks 22 in opposed sides to be spaced apart and face away from each other. Each first track 22 is configured to cooperate with one or more of the first bearings 16 to allow the runner 18 to be carried along the first bearings 16. In other embodiments (not shown), the first tracks 22 are separate rails securable to the runner 18 body.

In the illustrated embodiment, each first bearing 16 defines a convex running surface 48 and each first track 22 defines a complementary concave bearing surface 23. The concave bearing surface 23 is shaped to at least partially receive one or more of the first bearings 16. Arranging the bearing surfaces 23 between the rows 42, 44 to abut the first bearings 16 in each row 42, 44 traps the first tracks 22 between the first bearings 16. This arrangement facilitates longitudinal displacement of the runner 18 relative to the cabinet 17 whilst constraining transverse displacement of the runner 18 relative to the cabinet 17. In other embodiments (not shown), the first tracks 22 are arranged to face towards each other to trap the first bearings 16 between the tracks 22 and allow the runner 26 to be carried along the first bearings 16.

Returning to FIG. 5, a plurality of the second bearings 24 are mounted to the runner 18 to be spaced longitudinally along the runner 18. Each second bearing 24 is in the form of a rotatably mounted roller defining a concave running surface 51. The runner defines a channel 34 (FIGS. 6 and 7) between the first tracks 22 and the second bearings 24 are mounted within the channel 34. This configuration positions the second bearings 24 to minimise a transverse profile of the runner 18. In other embodiments (not illustrated), only a single second bearing 24, in the form of a rail, is mounted to the runner 18. In yet other embodiments (not illustrated), at least some of the second bearings 24 are in the form of non-rotatable bushings. In such embodiments, the rail and/or bushing is formed from a self-lubricating material, such as nylon.

The second bearings 24 are arranged in two rows 25, 27 extending longitudinally along the runner 18. The rows 25, 27 are spaced apart from each other towards respective first tracks 22. The upper row 25 is arranged closest to one track 22 and the lower row 27 is arranged closest to the other track 22. Arranging the rows 25, 27 in this way allows the second bearings 24 forming the upper row 25 to ride along one of the bearing surfaces 30, 31 of each pair of bearing surfaces 30, 31 (FIG. 7), and the second bearings 24 forming the lower row 27 to ride along the other bearing surface 30, 31 of each pair of bearing surfaces 30, 31.

The second bearings 24 of the upper row 25 are spaced longitudinally along the runner 18 to be alternately interposed with the second bearings 24 of the lower row 27. This arrangement enhances engaging the track member 26 with each of the rows 24, 27 as the track member 26 is carried along the second bearings 24 towards the stowed position. This arrangement also assists minimising play between the track member 26 and the runner 18.

Figure 8:
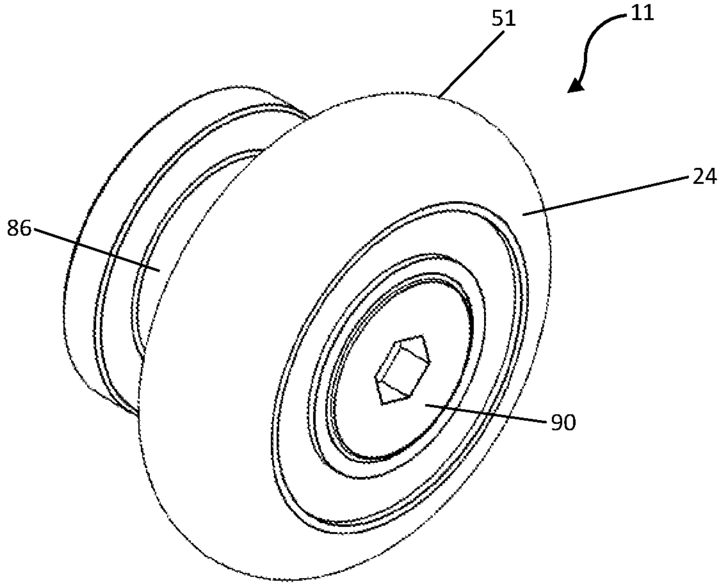
FIG. 8 is a perspective view of a bearing sub-assembly, which is part of the runner assembly illustrated in the previous figures, shown in isolation.
Figure 9:
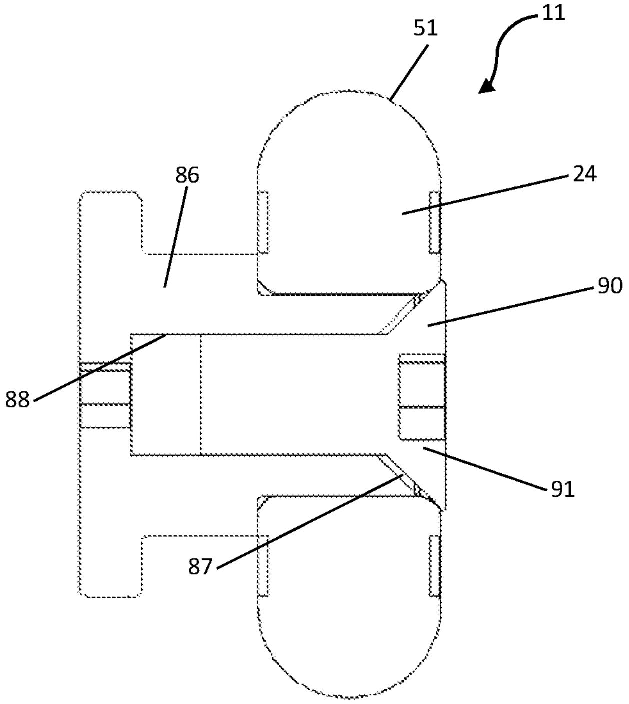
FIG. 9 is a cross-sectional view of the bearing assembly shown in FIG. 8.

FIGS. 8 and 9 illustrate a sub-assembly 11 of the runner assembly 10, the sub-assembly 11 including one of the second bearings 24 rotatably mounted to a shaft 86 and secured thereto by a fastener 90. The shaft 86 is mountable to extend from the channel 34 of the runner 18, and defines an internal thread 88 which the fastener 90 is configured to engage. The fastener 90 is shaped to allow flush mounting to the second bearing 24 so that the fastener 90 fits within a transverse width of the bearing 24. In the illustrated embodiment, this is achieved by the shaft 86 having a bevelled free end 87 and the fastener 90 having a complementary countersunk head 91.

Returning to FIGS. 6 and 7, a cross-sectional front view of the receptacle assembly 100 is shown illustrating the components of the runner assemblies 10 cooperating to carry the drawer 13 relative to the cabinet 17. In the illustrated embodiment, the track member 26 is in the form of a rail, such as formed by extrusion or bent sheet metal, and is mounted to a side of the drawer 13, such as by spot welding. In other embodiments (not illustrated), the track member 26 is integrally formed with the drawer, such as formed by extrusion. In yet other embodiments (not illustrated), the track member 26 comprises two separate rails securable to the drawer 13 in a spaced relationship to allow receiving the second bearings 24.

The track member 26 is arranged to extend parallel to the runner 18 within the channel 34. The track member 26 defines the second track 28 to have two pairs of opposed bearing surfaces 30, 31. The bearing surfaces 30, 31 of each pair are spaced apart such that the track member 26 can receive the second bearings 24. The second track 28 is configured so that receiving the second bearings 24 positions the upper bearing surface 30 of each pair proximal to the upper first track 22 (defined by the runner 18), and positions the lower bearing surface 31 of each pair proximal to the lower first track 22. This arrangement allows the pairs of bearings surfaces 30, 31 to abut and run along an operatively top region of the second bearings 24 in the upper row 25 and run along an operatively bottom region of the second bearings 24 in the lower row 27. It will be appreciated that in other embodiments (not shown), the second track 28 comprises only a single pair of the opposed, spaced bearing surfaces 30, 31, and that these surfaces 30, 31 may be alternatively orientated relative to each other, for example, to be parallel to each other.

A first pair of the bearing surfaces 30*a*, 31*a* are arranged at an angle relative to the axes of rotation of the second bearings 24 to abut an operatively outer region of the running surfaces 51. A second pair of the bearing surfaces 30*b*, 31*b* are arranged at a complementary mirrored angle relative to the axes of rotation of the second bearings 24 to abut an operatively inner region of the running surfaces 51. Each bearing surface 30*a*, 31*a*, 30*b*, 31*b* of each pair is therefore arranged to incline relative to the corresponding bearing surface 30*a*, 31*a*, 30*b*, 31*b* of the other pair to form a valley 82 between the pairs of bearings surfaces 30*a*, 31*a*, 30*b*, 31*b*. These valleys 82 are shaped to cooperate with the running surfaces 51 to reduce friction between the track member 26 and the second bearings 24.

In the illustrated embodiment, each valley 82 formed between the pairs of bearing surfaces 30*a*, 31*a*, 30*b*, 31*b* is arranged to face towards the other valley 82. This arrangement allows trapping the second bearings 24 between the valleys 82. This enhances constraining transverse displacement of the track member 26 relative to the runner 18. In other embodiments (not illustrated), the second bearings 24 are mounted to the runner 26 to form two rows spaced apart sufficiently to receive the track member 26 between the rows, and the bearing surfaces 30*a*, 31*a*, 30*b*, 31*b* are arranged to form two valleys 82 facing away from each other to run along the second bearings 24. This arrangement traps the bearing surfaces 30*a*, 31*a*, 30*b*, 31*b* between the second bearings 24 to constrain transverse motion of the track member 26 with respect to the second bearings 24.

Best shown in FIG. 6, the receptacle assembly 100 includes a pair of the runner assemblies 10 secured to opposed sides of the drawer 13 and cabinet 17. It will be appreciated that in other embodiments (not illustrated), the receptacle assembly 100 includes more or less runner assemblies 10, for example, depending on the load required to be carried by the drawer 13.

FIGS. 10 to 13 illustrate an alternative receptacle assembly 201 including a locking system 200 operable to releasably secure a drawer 213 to a cabinet 217 in a stowed position within the cabinet 217, referred to as the locked position. Whilst the locking system 200 is illustrated mounted to the receptacle assembly 201 it will be appreciated that the locking system 200 is configurable to releasably lock other receptacles, such as a tray, tub or container, which are slidably movable relative to other static locations, such as a housing, rack or a wall. It will also be appreciated that the locking system 200 is mountable to the receptacle assembly 100 described above to releasably secure the drawer 13 to the cabinet 17.

The locking system 200 includes: a powered locking mechanism 202 securable relative to the drawer 213 or cabinet 217, the locking mechanism 202 being operable to releasably secure the drawer 213 in a locked position to constrain movement relative to the cabinet 217; an actuator 204 securable to the drawer 213, the actuator 204 operable to cause the locking mechanism 202 to release the drawer 213 to allow movement relative to the cabinet 217; a first electrical contact 206 connected to the actuator 204 and being mountable to the drawer 213; and a second electrical contact 208 connected to the locking mechanism 202 and being mountable to the cabinet 217 to allow coupling with the first electrical contact 206 when the drawer 213 is in the locked position.

Figure 10:
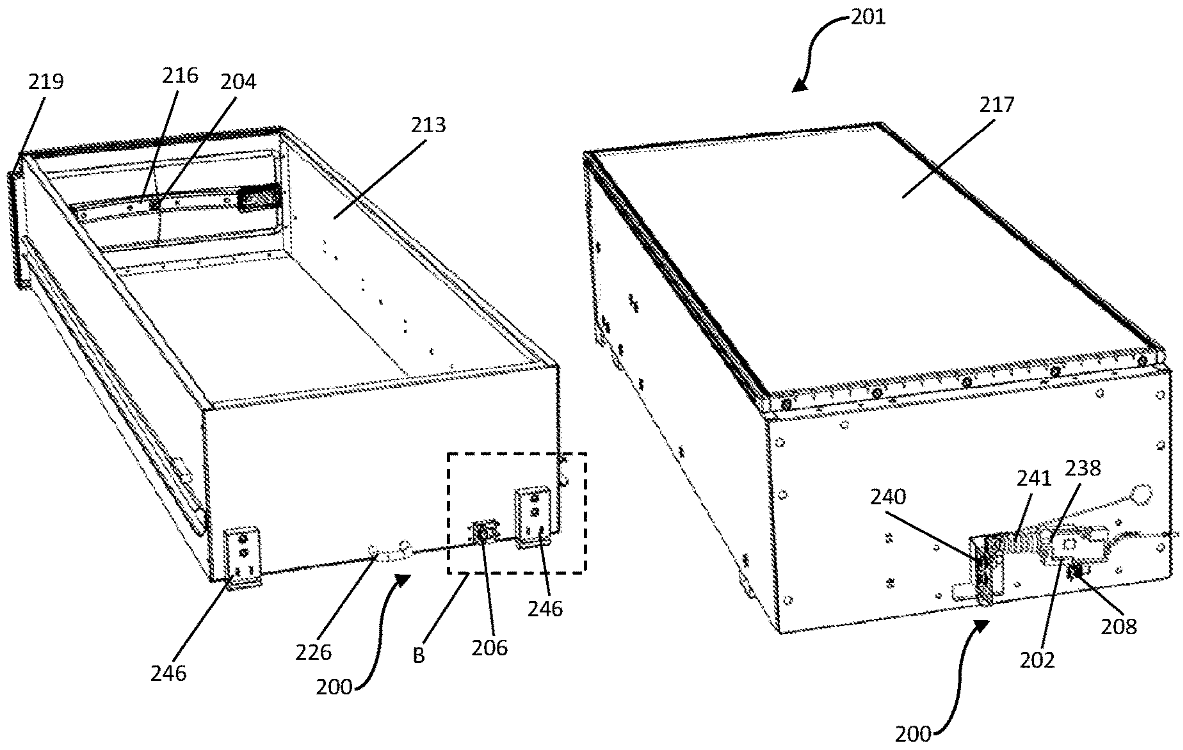
FIG. 10 is a rear perspective view of the receptacle assembly shown in the previous figures illustrating a locking system.

FIG. 10 shows the drawer 213 removed from the cabinet 217 to illustrate aspects of the locking system 200. The drawer 213 includes a catch structure, in the form of a ring 226, extending from a rear portion of the drawer 213. The locking mechanism 202 is mounted to a complementary rear portion of the cabinet 217 and typically connected to a power supply. For example, where the receptacle assembly 201 is installed in a vehicle (not shown), the locking mechanism 202 is connected to a battery on-board the vehicle. Operation of the locking mechanism 202 when the drawer 213 is in the stowed position allows releasably engaging the ring 226 to retain the drawer 213 within the cabinet 217, i.e. in the locked position. In other embodiments (not shown), the catch structure is secured to, or formed by, the cabinet 217 and the locking mechanism 202 is mounted to the drawer 213.

The locking mechanism 202 includes a locking actuator, in the form of an electric solenoid 238. The solenoid 238 is operable to actuate a locking member, in the form of an arcuate member 240. Actuating the arcuate member 240 rotates the arcuate member 240 to allow engaging or disengaging the ring 226. The locking mechanism 202 is typically configured to automatically operate when the ring 226 contacts the mechanism 202.

Figure 11:
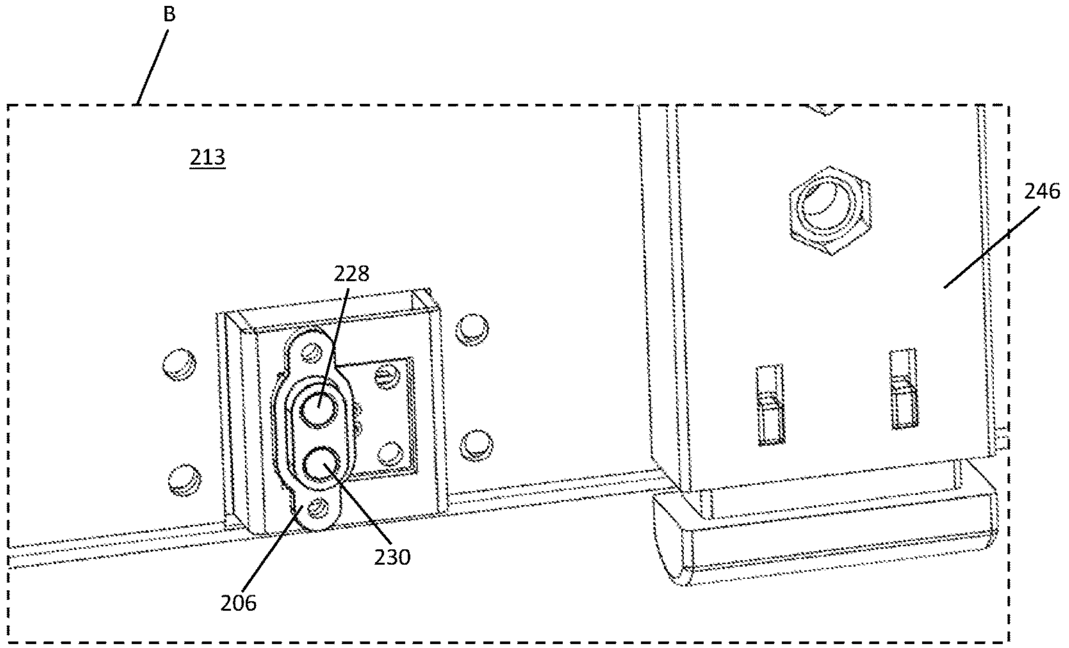
FIG. 11 is a detailed view of part of the locking system as shown in Box B in FIG. 10.

Best shown in FIG. 11, a first electrical contact 206 is mounted to the rear portion of the drawer 213. The first contact 206 is electrically connected to the actuator 204 (discussed further below). One of a pair of rear stop members 246 mounted to a rear of the drawer 213 is shown spaced from the first contact 202. The stop members 246 are arranged to buffer against the cabinet 217 when the drawer 213 is arranged in a full extension position relative to the cabinet 217.

Figure 13:
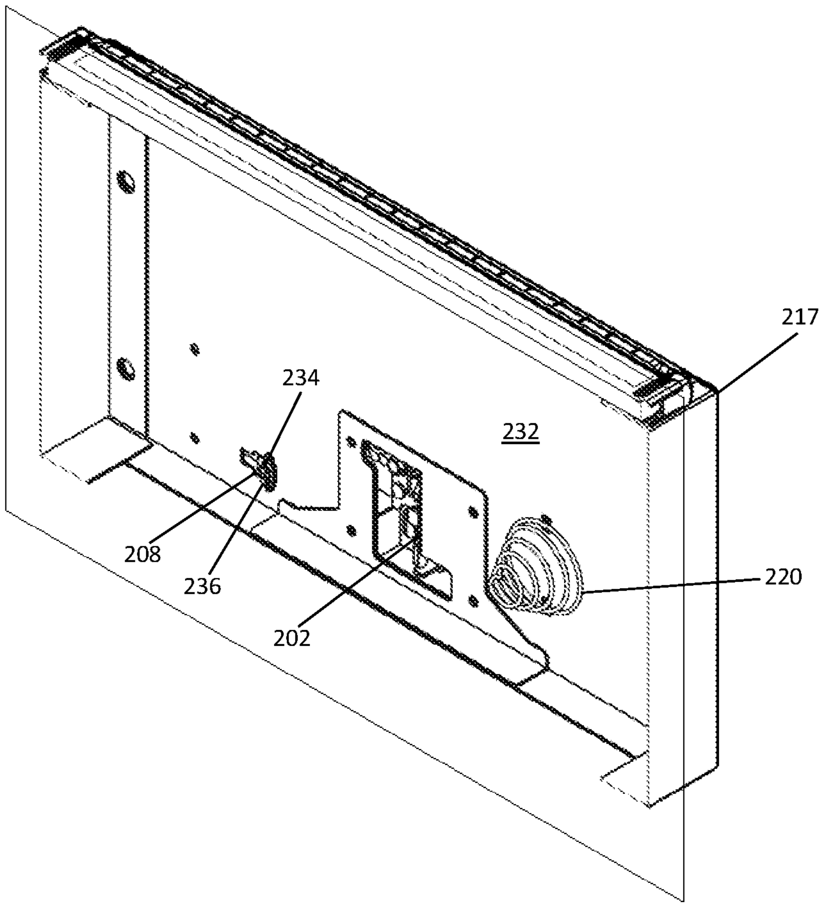
FIG. 13 is a perspective cross-section view of a cabinet, which is part of the receptacle assembly illustrated in the previous figures, shown in isolation.

Best shown in FIG. 13, a second electrical contact 208 is mounted to an internal rear wall 232 of the cabinet 217. The second contact 208 is electrically connected to the locking mechanism 202. In some embodiments, the second contact 208 is connected to the locking mechanism 202 via an actuating conductor (not illustrated), and in other embodiments, the second contact 208 is connected to the locking mechanism 202 via a controller (not illustrated). The second electrical contact 208 is arranged to be aligned with the first electrical contact 206 such that the contacts 206, 208 couple when the drawer 213 is arranged in the locked position. Coupling the contacts 206, 208 supplies power from the locking mechanism 202 to the actuator 204.

In the illustrated embodiment, the first contact 206 includes a pair of contact pads arranged within sockets 228, 230, and the second contact includes a complementary pair of contact pins 234, 236. The pins 234, 236 are resiliently mounted, typically being 'pogo pins', to allow movement relative to the cabinet 217, for example, should the drawer 213 be forcefully urged into the stowed position causing the first contact 206 to collide with the second contact 208.

The first contact 206 is typically connected to the actuator 204 via a wired connection comprising an input conductor (not illustrated) connected to the first socket 228 and an output conductor (not illustrated) connected to the second socket 230. The actuator 204 includes a switch (not illustrated) connected to each conductor.

Figure 12:
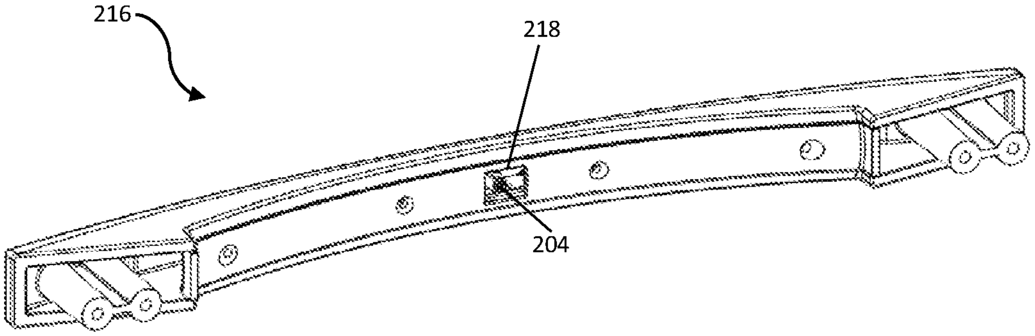
FIG. 12 is a rear perspective view of a handle, which is part of the receptacle assembly illustrated in the previous figures, shown in isolation.

Best shown in FIG. 12, the drawer 213 includes a handle 216 mounted to a front wall 219 of the drawer 213. In the illustrated embodiment, the actuator 204 is in the form of a depressible button 218 connected to the switch and arranged on an inner surface of the handle 216. This usefully places the actuator 204 in an ergonomic and sheltered location, providing protection from moisture and dust ingress. Operating the button 218 causes activation of the switch to connect the conductors. In other embodiments, the actuator 204 is alternatively arranged, such as in the frame of the drawer 213 or cabinet 217, and embodied as alternative hardware, such as a sensor, capacitive switch, or mechanical lever. For example, the actuator 204 is configurable as a biometric sensor, such as a fingerprint reader, a pressure sensor, or the like.

Returning to FIG. 13, a biasing mechanism, in the form of a compression spring 220, is mounted to the rear wall 232. The spring 220 is arranged to bias the drawer 213 away from the locked position. When the drawer 213 is moved to the locked position, the drawer 213 compresses the spring 220. When the locking mechanism 202 is operated to release the ring 226, the drawer 213 is urged away from the locked position by the spring 220 decompressing. It will be appreciated that in other embodiments (not shown), the biasing mechanism may include other resiliently deformable members, such as a foam block, or other mechanisms, such as a powered piston operable to push the drawer 213 away from the locked position, or a pair or electro magnets mounted to the drawer 213 and the cabinet 217 and operable to repel each other. It will be appreciated that in other embodiments (not shown), the biasing mechanism 220 is mountable to the drawer 213.

In some embodiments, operation of the locking system 200 is mediated by a controller. For example, the system 200 is configurable such that operating the actuator 204 causes a signal to be sent to the controller to cause operation of the locking mechanism 202. In one such embodiment, the controller is communicatively connected to an external security system, such as a vehicle's central locking system, so that when the security system is armed (e.g. the vehicle is locked), the controller is configured to prevent actuation of the locking mechanism 202. This may include the controller being configured to over-ride operation of the actuator 204 in this state. This can beneficially improve the security of the locking system 200 by impeding unauthorised access to the drawer 213.

Installation of the runner assembly 10 involves mounting at least one pair of the first bearings 16 to the side wall 15 of the cabinet 17 to be spaced apart, in the illustrated embodiment forming two rows 42, 44 of first bearings 16, and mounting the track member 26 to the drawer 13. The runner 18 is inserted between the pairs of first bearings 16 so that the opposed and spaced first tracks 22 ride along the first bearings 16. The track member 26 is inserted into the channel 34 defined by the runner 18 to abut the second bearings 24. The second track 28 is shaped to receive the second bearings 24 such that opposed and spaced bearing surfaces 30, 31 are arranged proximally to respective first tracks 22, and ride along the second bearings 24. The arrangement of the bearing surfaces 30, 31 in this way allows the track member 26 to run along an operatively top portion and an operatively bottom portion of the second bearings 24, allowing the track member 26 to trap the second bearings 24 to form a secure slidable engagement. The drawer 13 is then suspended from the cabinet 17 by the runner assembly 10.

Use of the runner assemblies 10 fitted to the receptacle assembly 100 allows moving the drawer 13 from the stowed position (FIG. 3) to the full-extension position (FIG. 1). To move the drawer 13 between the positions, force is applied by a user to the drawer 13, typically to a handle 32 mounted to a front of the drawer 13, either towards or away from the cabinet 17.

When the drawer 13 is in the full-extension position, force applied by the user in a first direction, towards the cabinet 17, causes the drawer 13 and track members 26 to move in the first direction along the second bearings 24. Continued motion causes the front of the drawer 13 to collide with the stop caps 72 to transfer force to the runners 18. Further application of force causes the drawer 13, track members 26 and runners 18 to move in the first direction along the first bearings 16 until the drawer 13 is arranged in the stowed position.

Moving the drawer 13 from the stowed position to the full-extension position involves the same steps in reverse. That is, the user applies force to the front of the drawer 13, typically by pulling the handle 32, in a second direction, away from the cabinet 17. This causes the drawer 13 and the track members 26 to be carried along the second bearings 24 in the second direction. Continue motion causes the drawer 13 to collide with the stop blocks 77 when the track member 26 has reached its maximum extension with respect to the runners 18.

Further application of force by the user causes the drawer 13, track members 26, and runners 18 to move in the second direction along the first bearings 16. Continue motion causes the catch members 52 to collide with and engage the first bearings 161 at the distal ends of the upper rows 42. The drawer 13 is then arranged in the full-extension position providing optimal access to the recess of the drawer 13.

Use of the locking system 200 involves a user moving the drawer 213 from any extended position to a stowed position, within the cabinet 217, to cause the locking mechanism 202 to operate to secure the drawer 213 to the cabinet 217. This involves force being applied by the user, typically by pushing the handle 216, towards the cabinet 217. This causes the drawer 213 to move in a first direction, towards the cabinet 217, gradually compressing the spring 220 until the drawer 213 is in the stowed position.

In the stowed position, the ring 226 triggers the locking mechanism 202 to engage the ring 226, consequently securing the drawer 213 in the locked position. In this position, the first electrical contact 206 couples with the second electrical contact 208 due to the pins 234, 236 engaging and the sockets 228, 230. When coupled, power is conveyed to the actuator 204, arming the locking system 200.

Releasing the drawer 213 from the locked position involves the user operating the actuator 204 by pressing the depressible button 218. This operates the switch to cause power to be supplied to the locking mechanism 202. This activates the solenoid 238 to move the arcuate member 240 to disengage the ring 226. When disengaged, the spring 220 decompresses to cause the drawer 213 to extend at least partially out of the cabinet 217. The user can then apply force to the drawer 213, typically by pulling the handle 216, to move the drawer 213 further away from the cabinet 217.

The runner assembly 10 is configured to allow carrying a receptacle 12, such as the drawer 13, to extend away from a structure 14, such as the cabinet 17, by a substantial distance, equivalent to, or in some embodiments, greater than, a longitudinal length of the receptacle 12. This enhances access to the receptacle 12, for example, to access cargo carried by the drawer 13.

The runner assembly 10 includes very few components to achieve this, being at least one pair of the first bearings 16, the elongate runner 18 having at least one second bearing 24 mounted thereto, and a track member 26. The runner 18 includes opposed and spaced first tracks 22 arranged to cooperate with the first bearings 16 to carry the runner relative to the structure 14. The track member 26 includes opposed and spaced bearing surfaces 30, 31 arranged to cooperate with the at least one second bearing 24 to carry the receptacle 12 relative to the runner 18. The track member 26 is configured so that when the track member 26 receives the at least one second bearing 24, the bearing surfaces 30, 31 are specifically arranged so that one bearing surface 30 is spaced closest to one of the first track 22 and the other bearing surface 31 is spaced closest to the other first track 22.

The arrangement of the bearing surfaces 30, 31 in this way advantageously allows the track member 26 to be carried along opposed sides of the at least one second bearing 24, being an operatively top side and an operatively bottom side. This forms a secure slidable engagement between the track member 26 and the runner 18 which minimises play in an operatively vertical and horizontal direction. This is particularly useful where the runner assembly 10 is used to slidably mount the drawer 13 to the cabinet 17 installed in an off-road vehicle.

Furthermore, the configuration of the at least one second bearing 24 relative to the track member 26 means that the at least one second bearing 24 faces towards the track member 26 to be at least partially concealed, minimising exposure of the at least one second bearing 24. Instead, only the track member 26 is exposed when the receptacle 12 extends away from the structure 14. This arrangement enhances durability of the runner assembly 10, particularly where the assembly 10 is often exposed to dusty, sandy and/or humid environments.

The locking system 200 includes the first electrical contact 206 which is mountable to a receptacle, such as the drawer 213, and the second electrical contact 208 which is mountable to a structure, such as the cabinet 217. The first contact 206 is separate to the second contact 208 and couplable in a defined position, i.e. when the receptacle is secured relative to the structure by the locking mechanism 202 in the locked position. Operating the actuator 204 causes the locking mechanism 202 to release the receptacle and allow movement relative to the structure. This decouples the contacts 206, 208 preventing power being supplied to the actuator 204 and consequently to the receptacle. This advantageously prevents power being drawn by the locking system 200 when the receptacle is not in the locked position. Where power is supplied to the locking system 200 by a battery, this usefully conserves battery capacity. This arrangement also means that no wires are required to convey power between the structure and the receptacle. As such, the receptacle can move uninhibited by wires when released from the locked position.

The locking mechanism 202 is mountable to the rear wall 232 of the cabinet 217, and the actuator 204 is mountable to the front wall 219, or handle 216, the drawer 213. This enhances ergonomics of the receptacle assembly 201 by optimising weight and bulk of the drawer 213 and conveniently locating the actuator 204 for intuitive operation by the user.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A runner assembly for carrying a receptacle towards and away from a structure, the runner assembly including:

at least one pair of first bearings, each first bearing being mountable to the structure so that the first bearings of the at least one pair are spaced apart;

an elongate runner defining a longitudinal length and having an opposed pair of first tracks spaced from each other, each first track configured to cooperate with the first bearings to allow the runner to be received between and carried by the first bearings;

a plurality of second bearings mounted to, and spaced longitudinally along, the runner; and an elongate track member mountable to the receptacle, the elongate track member having a second track defining two pairs of opposed bearing surfaces comprising a pair of first bearing surfaces and a pair of second bearing surfaces spaced from each other and configured to cooperate with the plurality of second bearings, the runner defines a channel arranged, in use, to face the track member and the receptacle to receive the pairs of first and second bearing surfaces of the track member, and the plurality of second bearings are mounted within the channel to be concealed during operation of the runner, the plurality of second bearings being arranged in two rows extending longitudinally along the runner within the channel, the two rows spaced apart from each other towards the first tracks, the second bearings of one row arranged, in use, to abut the pair of first bearing surfaces, and the second bearings of the other row arranged to abut the pair of second bearing surfaces, and each pair of bearing surfaces arranged to incline relative to each other such that each pair of bearing surfaces define a valley, each valley being configured to cooperate with the second bearings to constrain transverse displacement of the track member relative to the runner.

2. The runner assembly of claim 1, wherein each of the first tracks and the second track are shaped to cooperate with the respective bearings to facilitate longitudinal displacement of the runner relative to the structure and the track member whilst constraining transverse displacement of the runner relative to the structure and the track member.

3. The runner assembly of claim 1, wherein the valleys are arranged to face towards each other to allow trapping the second bearings between the valleys.

4. The runner assembly of claim 1, wherein the second bearings of one row are spaced longitudinally along the runner and alternately interposed with the second bearings of the other row.

5. The runner assembly of any claim 1, wherein each first bearing and each second bearing is a rotatably mountable roller.

6. The runner assembly of claim 5, wherein each second bearing is rotatably mounted to a shaft extending from the runner, the shaft defining an internal thread and having a fastener engaged with the thread to retain the second bearing to the shaft, the fastener shaped to allow flush mounting to the second bearing.

7. The runner assembly of claim 5 wherein each roller defines a convex running surface configured to cooperate with one of the first tracks and the second track.

8. The runner assembly of claim 7, wherein each first track defines a concave bearing surface shaped to at least partially receive the running surface of the first bearings.

9. The runner assembly of claim 1, wherein the runner includes a stop member arranged to interact with at least one of the first bearings to limit longitudinal displacement of the elongate runner relative to the structure.

10. A receptacle assembly including:

a housing;

a receptacle, and the runner assembly of claim 1, wherein:

the at least one pair of first bearings are mounted to the housing such that the first bearings are spaced apart;

the elongate track member is mounted to the receptacle; and the elongate runner is arranged between the housing and the receptacle such that the first tracks are carried by the first bearings, and the second track is carried by the second bearings.

11. The receptacle assembly of claim 10, wherein the housing is configured as a cabinet and the receptacle is configured as a drawer.

* * * * *